United States Patent
Barrett, Sr.

(10) Patent No.: US 6,311,291 B1
(45) Date of Patent: Oct. 30, 2001

(54) REMOTE MODEM CONTROL AND DIAGNOSTIC SYSTEM AND METHOD

(75) Inventor: Ronald Laurence Barrett, Sr., Alameda, CA (US)

(73) Assignee: PC-Tel, Inc., Milpitas, CA (US)

( * ) Notice: Subject to any disclaimer, the term of this patent is extended or adjusted under 35 U.S.C. 154(b) by 0 days.

(21) Appl. No.: 09/132,811

(22) Filed: Aug. 12, 1998

(51) Int. Cl.$^7$ ..................................................... G06F 11/00
(52) U.S. Cl. ............................................... 714/25; 379/222
(58) Field of Search .................................. 714/25, 2, 4, 6, 714/13, 18, 26, 27, 37, 43, 44, 712, 714, 717; 379/222, 224, 10, 12

(56) References Cited

U.S. PATENT DOCUMENTS

| | | | |
|---|---|---|---|
| 4,112,264 | * 9/1978 | Abramson et al. | 179/175.3 R |
| 4,385,384 | * 5/1983 | Rosbury et al. | 371/22 |
| 4,951,309 | * 8/1990 | Gross et al. | 379/93 |
| 5,072,370 | * 12/1991 | Durdik | 395/575 |
| 5,148,435 | * 9/1992 | Ray, Jr. et al. | 371/20.5 |
| 5,333,152 | * 7/1994 | Wilber | 379/98 |
| 5,715,174 | * 2/1998 | Cotichini et al. | 364/514 R |
| 5,764,694 | * 6/1998 | Rahamim et al. | 375/224 |
| 5,802,280 | * 9/1998 | Cotichini et al. | 395/200.3 |
| 5,815,652 | * 9/1998 | Ote et al. | 395/183.07 |
| 5,943,391 | * 8/1999 | Nordling | 379/1 |
| 6,044,476 | * 3/2000 | Ote et al. | 714/31 |

* cited by examiner

Primary Examiner—Nadeem Iqbal

(57) ABSTRACT

A remote modem control and testing system includes a remote diagnostic unit (RDU) and a control computer linked by telephone lines and control modems. The RDU also includes a test software modem and a reference modem. An operator of the control computer uses remote control software installed on both the control computer and the RDU to operate the RDU, modify or install software on the RDU, test the test modem, and compare performances of the test modem and the reference modem.

25 Claims, 1 Drawing Sheet

US 6,311,291 B1

REMOTE MODEM CONTROL AND DIAGNOSTIC SYSTEM AND METHOD

BACKGROUND OF THE INVENTION

1. Field of the Invention

The invention relates to a system for remote control of a computer system, and in particular to real-time remote diagnostic computer systems to monitor, update, and repair remotely located modems. This invention further relates to a method of monitoring, updating, and repairing remotely located modems.

2. Description of Related Art

Computers traditionally use modems for transmitting and receiving data over telephone lines. One type of modem, a host signal processing (HSP) modem, uses a central processing unit (CPU) in a host computer to perform processing tasks that are more commonly performed by modem hardware such as a digital signal processor in a conventional modem. For example, a conventional modem receives data from a host computer, uses hardware in the modem to convert the data to an analog signal in compliance with a communication protocol, and transmits the analog signal to a remote device. The conventional modem also receives an analog signal from the remote device, uses hardware in the modem to extract data from the analog signal, and passes the data to the host computer.

In an HSP modem, also known as a software modem, the host computer executes software that performs many of the conversions performed by a digital signal processor or other hardware in a conventional modem. Hardware in the HSP modem performs simple analog-to-digital and digital-to-analog conversions such as converting a received analog communication signal to a series of digital samples that represent amplitudes of the received signal. The host computer executes software that interprets the samples according to a communication protocol and derives the received data from the samples. The host computer also generates a series of output samples that represent amplitudes of a transmitted communication signal in compliance with the protocol, and hardware of the HSP modem converts the output samples into the transmitted signal. When compared to conventional modems, HSP modems have less complex (and less expensive) hardware because with HSP modems, the host computer performs many of the tasks performed by hardware in conventional modems.

An additional benefit of HSP modems is that a user can modify or upgrade the modem by simply installing updated HSP software onto the host computer. This eliminates the need for costly hardware upgrades and enables the user to modify the performance of the HSP modem relatively frequently and economically.

The analog signals sent from modems are typically sent over conventional telephone lines. The characteristics of the carrier telephone lines can vary significantly from location to location. The variation in signal-carrying characteristics and quality becomes particularly acute when dealing with telephone lines overseas.

Testing and modifying modems, both conventional hardware modems and HSP modems, has heretofore required that an operator or tester be in the area where modem performance is being tested on local phone lines. The necessity of having an operator of the computer system and modem being tested often requires a great deal of time and expense, particularly when the computer system is located inconveniently, such as at a remote overseas site. For vendors, diagnosing and repairing complex hardware and software problems on a customer's installed computer system typically requires that a support technician travel to the customer's location to work on the computer system on-site. This also involves a great deal of time and travel expense, particularly in the case of systems installed overseas. Similar types of expenses are incurred when a modem manufacturer wishes to test the performance of a particular modem over the local telephone lines at a remote site.

SUMMARY OF THE INVENTION

In accordance with the invention, a remote modem control and diagnostic system is provided which includes a remote diagnostic unit (RDU) and a control computer linked by telephone lines and a control modem. The RDU also includes a test modem and a reference modem. A computer operator located at the control computer, through the use of remote control software installed on both the control computer and the RDU, operates the RDU to test the test modem, to perform comparisons of the test modem and the reference modem, to modify the RDU or test modem, and to install new modem software on the RDU.

In accordance with the invention, a method for remote control of a computer system and modem is provided by: establishing a communication connection between a first computer unit and a second computer unit using a first control modem provided in the first computer unit and a second control modem provided in the second computer unit; and using the first computer unit to remotely control the second computer unit. The second computer is then directed to perform one or more functions including operating a test modem provided in the second computer unit, operating a reference modem provided in the second computer unit, installing modem software on the second computer unit, and modifying modem settings on the second computer unit.

Typically the communication connection is a telephone line. The method may further include monitoring how the test modem performs on a local telephone line connected to the second computer unit and comparing the performances of the test modem and the reference modem on the local telephone line. The method can compare the performance of the test modem over a first local telephone line with the performance of the reference modem over a second local telephone line. In an exemplary embodiment, the test modem is a software modem that includes a software modem driver that converts samples of an analog received signal to input digital data and converts output data to samples representing an analog transmitted signal.

In accordance with an embodiment of the invention, a system for remote control of a computer system and modem is provided, including: a first computer unit having a first control modem; a second computer unit having a second control modem and a test modem; and a first communication connection between the first control modem and the second control modem. The first computer unit remotely controls the second computer unit via the first communication connection to perform one or more functions such as operating the test modem provided in the second computer unit over a second communication connection, installing modem software on the second computer unit, and modifying modem settings on the second computer unit.

The second computer can be remotely controlled by the first computer to operate a reference modem in the second computer. The reference modem operates over the second or a third communication connection. In an exemplary embodiment of the invention, the test modem is a software modem that includes modem software in the form of an application, an interrupt routine, or a driver. Alternatively, the test modem is a hardware modem with flash ROM.

DETAILED DESCRIPTION OF THE PREFERRED EMBODIMENTS

Figure 1:
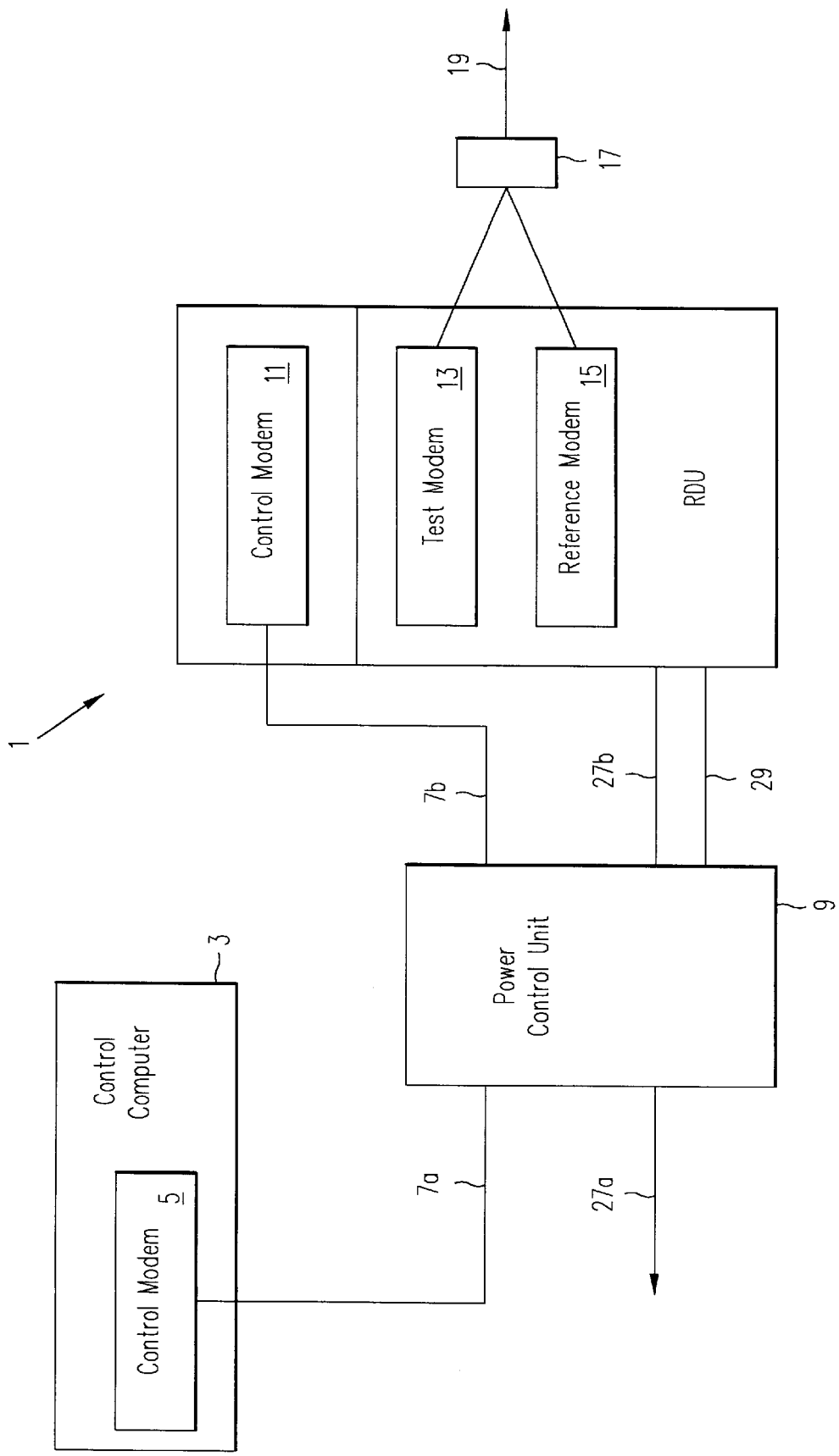
FIG. 1 is a block diagram of a modem testing system in accordance with an embodiment of the invention.

FIG. 1 shows an exemplary embodiment of a modem testing system 100 in accordance with this invention. System 100 includes a remote diagnostic unit (RDU) 1 and a control computer 3 that are connected via a control line 7a and a power control unit 9. RDU 1 is a conventional computer having a processing unit, a main memory, and a local bus (not shown). In one embodiment of the invention, RDU 1 is an IBM or compatible personal computer, and the local bus is an ISA, VESA, PCI, or serial bus. It is noted, however, that the connection can be made with any of various types as are well known in the art. Independently connected to the local bus are a control modem 11, a test modem 13, and a reference modem 15. Test modem 13 and reference modem 15 are connected through a T-connector 17 to an outgoing line 19, preferably a local telephone line.

Control modem 11 may be a standard hardware modem as is well known in the art, and is connected via a local control line 7b through power control unit 9 to control line 7a. Control line 7a, which links control computer 3 and RDU 1, may be any type of telecommunications channel, including but not limited to international public-switched telephone networks, TCP/IP links, and cellular connections. Control computer 3 is also a conventional computer having a processing unit, a main memory, and a local bus (not shown), with control computer modem 5 connected to a local bus of control computer 3.

The operation of the preferred embodiment is as follows. An operator at control computer 3 uses control computer modem 5 to make a modem connection to the control modem 11 in RDU 1 via control line 7a, power control unit 9, and local control line 7b. RDU 1 is preconfigured to remain in stand-by mode, and automatically makes the connection with control computer 3 without an operator preset at RDU 1. Using remote control computer software as is well-known in the art, such as Symantec Corporation's pcAnywhere™, the operator at control computer 3 remotely controls RDU 1.

To analyze the performance of the test modem 13, the operator commands RDU 1 to connect to outgoing line 19 using reference modem 15. The operator can then execute an experiment, such as a binary file transfer over outgoing line 19. The performance of reference modem 15, including factors such as connect speed and transfer time are recorded. Preferably, reference modem 15 is a well-tested modem with known performance characteristics and established reliability.

The operator can then command RDU 1 to connect to outgoing line 19 using test modem 13, and re-execute the same experiment, this time monitoring test modem 13 and comparing the performance of test model 13 and reference modem 15. If necessary, test modem 13's settings can be modified. Preferably, test modem 13 and reference modem 15 connect to the same outgoing line 19 via T-connector 17 for more accurate performance comparisons. However, test modem 13 and reference modem 15 can connect to separate outgoing lines as well. Since reference modem 15's performance characteristics are well established, any degradation in test modem 13's performance caused by the outgoing line 19 can be more effectively analyzed by comparison with reference modem 15.

When the test modem 13 is an HSP modem, system 100 can be used to modify test modem 13 by installing new software on the host computer, RDU 1. Because in a conventional modem dedicated hardware in the modem performs these processing functions, to modify those functions typically requires that hardware be physically replaced in the host computer system. Some hardware modems include EEPROM for firmware uysed in DSP's. The firmware can be modified in a similar manner to modifying modem software. The present invention enables a user to vary the functions of an HSP modem through a modification of software along and to do so from a remote location.

A connection is made between control computer 3 and RDU 1 via control lines 7a and 7b, as described above, and control computer 3 transfers or downloads software from the memory of control computer 3 to the memory of RDU 1. Using remote control software, the operator at control computer 3 can install and/or modify the HSP modem software for test modem 13 on RDU 1, and then test its performance over outgoing line 19. These procedures can be performed independently, or in conjunction with tests run on reference modem 15.

This remote modem control and diagnostic system has numerous applications. It allows a developer to modify or upgrade the driver software for a test modem, install that software onto a remote user's computer system, and test the performance of the modified or upgraded software modem, all without the necessity of having an operator present at the remote computer. It also enables a vendor to maintain test sites internationally, where an installed host computer can be maintained with only minimal local human resources. Upgraded HSP software can be installed onto the test site remotely, and diagnostic tests can be run to monitor the software modem's performance on local telephone lines around the world.

Although the present invention has been described with reference to particular embodiments, the description is only an example of the invention's application and should not be taken as a limitation. Various adaptations and combinations of features of the embodiments disclosed will be apparent to those skilled in the art and are within the scope of the present invention as defined by the following claims.

I claim:

1. A method for remote testing a test modem, comprising:
    establishing a communication connection between a first computer unit and a second computer unit using a first control modem provided in said first computer unit and a second control modem provided in said second computer unit;
    transmitting modem software over said communication connection from said first computer unit to said second computer unit;
    installing said modem software as part of said test modem in said second computer unit; and
    using said first computer unit to remotely control said second computer unit, wherein said second computer unit is directed to operate said test modem in said second computer unit and test performance of said test modem on a telephone line that is local to said second computer unit and remote from said first computer unit.

2. The method of claim 1, wherein said first computer unit directs all active functions said second computer unit performs.

3. The method of claim 1, wherein said communication connection employs a second telephone line.

4. The method of claim 1, further comprising comparing performance of said test modem over said telephone line with performance of a reference modem over said telephone line.

5. The method of claim 1, further comprising comparing performance of said test modem over said telephone line with performance of a reference modem over a second telephone line that is local to said second computer unit.

6. The method of claim 1, wherein said test modem comprises a software modem.

7. The method of claim 1, wherein installing said modem software comprises storing said modem software in a flash EEPROM of said test modem.

8. The method of claim 1, wherein said modem software installed on said second computer unit includes one or more members of the group consisting of a software modem application and a software modem driver.

9. The method of claim 1, wherein said first computer unit via said communication connection actuates a power control unit to shut down and reboot said second computer unit.

10. A system for testing of a test modem, comprising:
   a first computer unit having a first control modem;
   a second computer unit having a second control modem and said test modem;
   a first communication connection between said first control modem and said second control modem; and
   a control system that enables said first computer unit to remotely control said second computer unit via said first communication connection to operate said test modem over a second communication connection that is local to said second computer unit, install modem software on said second computer unit as part of said test modem, and modify modem settings on said second computer unit.

11. The system of claim 10, wherein said second computer unit further comprises a reference modem, and said control system enables said first computer unit to operate said reference modem.

12. The system of claim 11, wherein said reference modem is operated over said second communication connection.

13. The system of claim 11, wherein said reference modem is operated over a third communication connection.

14. The system of claim 13, wherein said third communication connection is a telephone line.

15. The system of claim 10, wherein said first computer unit directs all active functions said second computer unit performs.

16. The system of claim 10, wherein said test modem is a software modem.

17. The system of claim 10, wherein said test modem is a hardware modem with flash EEPROM.

18. The system of claim 16, wherein said software installed on said second computer unit includes one or more members of the group consisting of a software modem application and a software modem driver.

19. The system of claim 10, wherein said first communication connection employs a telephone line.

20. The system of claim 10, wherein said second communication connection employs a telephone line.

21. The system of claim 10, wherein said control system comprises a power control unit supplying power to said second computer unit, wherein a signal sent from said first computer unit to said power control unit via said first communication connection actuates a shut down and restart of said second computer unit.

22. The system of claim 21, wherein said control system further comprises software that permits said first computer unit to control operation of said second computer unit.

23. A method for development of modem software, comprising:
   establishing a communication connection between a first computer unit and a second computer unit;
   using said first computer unit and said communication connection to remotely install said modem software on said second computer unit, said modem software becoming part of a test modem on said second computer unit; and
   using said first computer unit and said communicatioin connection to remotely operate said test modem and remotely test performance of said test modem when connected to telephone lines that are local to said second computer unit.

24. The method of claim 23, further comprising:
   using said first computer unit to remotely operate a reference modem that is in said second computer unit; and
   comparing said performance of said test modem when connected to said telephone lines to performance of said reference modem when said reference modem is connected to said telephone lines.

25. The method of claim 23, further comprising using said first computer unit and said communication connection to operate a power control unit in said second computer unit to shut down and reboot said second computer unit in response to a software crash in said second computer unit.

* * * * *